INVENTORS
WILLIAM K. SNEAD
JOHN F. KNOOP

United States Patent Office 3,705,008
Patented Dec. 5, 1972

3,705,008
PROCESS FOR THE PRODUCTION OF HYDRAZOIC ACID
William K. Snead, Wheeling, and John F. Knoop, New Martinsville, W. Va., assignors to PPG Industries, Inc., Pittsburgh, Pa.
Filed Nov. 24, 1970, Ser. No. 92,374
Int. Cl. C01b 21/08
U.S. Cl. 423—406          28 Claims

ABSTRACT OF THE DISCLOSURE

Hydrazoic acid is produced by acidifying alkali metal azide or alkaline earth metal azide. In order to repress contamination of the hydrazoic acid vapor with the feed acid, a cascade of stages of decreasing pH is employed. Hydrazoic acid vapor is removed from the cascade under conditions of relatively high pH and by-product solution is removed from the cascade under conditions of relatively low pH.

---

Figure 1:
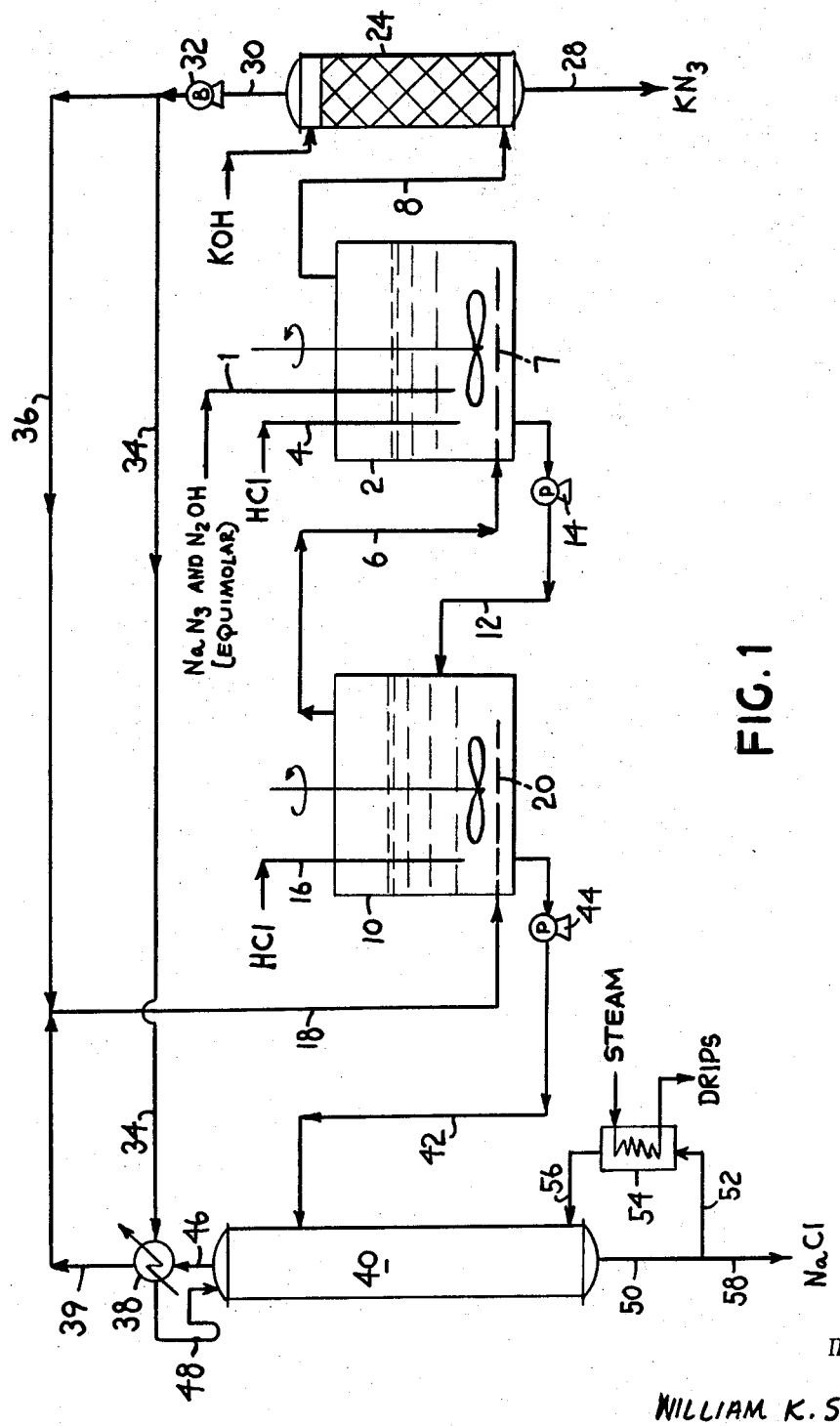

Hydrazoic acid is becoming of increasing importance, primarily as an intermediate in the preparation of various azide compounds such as its salts. Hydrazoic acid is bioactive and may be produced for those purposes. One particularly favorable use for hydrazoic acid is the preparation of alkali metal azide or alkaline earth metal azide by contacting the hydrazoic acid with the appropriate basic compound such as the hydroxide.

Hydrazoic acid may be prepared by several processes for which the basic chemistry is known. However, refinements must be made to the laboratory processes employing the basic chemistry in order to achieve a commercially successful plant capable of producing sizable amounts of hydrazoic acid.

One of the known laboratory methods for producing hydrazoic acid is the acidification of at least one alkali metal azide or alkaline earth metal azide with a feed acid, such as one or more of the strong mineral acids. Such process without further refinement results in a hydrazoic acid stream contaminated with excessive amounts of the feed acid. This is particularly true where the feed acid is relatively volatile.

While it is not desired to be bound by any theory, it is believed that several advantages to be gained through the use of this invention may be explained by considering the equilibria of the reactions taking place in the reaction media. Molecular hydrazoic acid may be regarded as engaged in the equilibrium $$HN_3 \rightleftharpoons H^+ + N_3^-$$

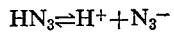

Le Chatelier's principle indicates that the formation of hydrazoic acid is favored by the presence of high concentrations of hydrogen ions. Henry's Law, though not strictly applicable to this non-ideal solution, is indicative of the fact that the partial pressure of hydrazoic acid vapor in equilibrium with the liquid increases with increasing concentration of hydrazoic acid in the liquid. From a consideration of only these principles, one would conclude that a low pH should be used to maximize hydrazoic acid production.

Unfortunately, the same principles also apply to the feed acid, represented for convenience by hydrochloric acid. Hydrochloric acid is similarly seen to be taking part in the equilibrium $$HCl \rightleftharpoons H^+ + Cl^-$$

Molecular hydrochloric acid formation and evolution are favored by low values of pH. If liquid containing dissolved azide is simply acidified to a low pH with hydrochloric acid, the hydrazoic acid vapor will be contaminated with hydrogen chloride. If the acidification is carried out to only moderate values of pH in an attempt to avoid hydrogen chloride contamination, substantial azide values are left in solution.

Accordingly, it is the purpose of this invention to provide both hydrazoic acid vapor containing only minor amounts of contaminating feed acid and an improved azide utilization, as compared with a simple acidification. This is accomplished by (1) maintaining a cascade of individual contacting stages wherein the stages both contain liquid having azide values therein and are arranged in order of decreasing pH of the liquid, (2) contacting in each of the stages liquid having azide values with feed acid to form hydrazoic acid, (3) underflowing liquid along the cascade to stages of decreasing pH, and (4) transferring a gas stream containing hydrazoic acid along the cascade to stages of increasing pH where the gas stream is contacted with liquid contained therein. Liquid is withdrawn from the last stage of the cascade and gaseous hydrazoic acid is removed from the first stage of the cascade.

If the feed acid is an oxygen-containing acid which will dissociate to its anhydride, the invention will serve to suppress contamination of the gaseous hydrazoic acid stream by both the acid and the anhydride. Sulfuric acid, for example, appears to take part in the equilibrium $$H_2O + SO_3 \rightleftharpoons H_2SO_4 \rightleftharpoons H^+ + HSO_4^- \rightleftharpoons 2H^+ + SO_4^{--}$$

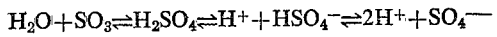

If hydrazoic acid vapor is removed from the cascade under conditions of relatively high pH, contamination by both sulfuric acid and sulfur trioxide is reduced. Similarly, contamination by the decomposition products of the anhydride, if any, is also reduced. Sulfur trioxide, for example, is in equilibrium with sulfur dioxide and oxygen:

$$SO_3 \rightleftharpoons SO_2 + \tfrac{1}{2} O_2$$

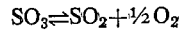

Suppression of sulfur trioxide contamination also serves to suppress contamination by sulfur dioxide.

Any of the acids which are stable and more acidic than hydrazoic acid may be used as the feed acid. The strong mineral acids are ordinarily used. Exemplary mineral acids are hydrochloric acid, sulfuric acid, nitric acid, and orthophosphoric acid. Other acids such as acetic acid are suitable. Of course, gases such as hydrogen chloride, sulfur trioxide, or nitric oxide may be used if water is introduced elsewhere so as to form the acid in situ. While this invention is applicable to any of these acids, it is particularly suitable where the feed acid is relatively volatile. An example of such a volatile acid is hydrochloric acid. Acidification in each stage may be by either a batch process or a continuous process. A continuous process is preferred. The azide treated with feed acid, hereinafter called the feed azide, is usually sodium azide.

The amount of feed acid employed in acidifying the feed azide may vary widely. If it is desired to convert only a portion of the feed azide to hydrazoic acid, the amount of feed acid used will be less than the stoichiometric amount. If substantially all of the feed azide is to be converted to hydrazoic acid, a stoichiometric amount of an excess of feed acid should be used. Of course, basic impurities present in the feed azide should be accounted for in determining the amount of feed acid to use. Ordinarily enough acid is used to lower the pH of the liquid reaction mixture to at least 6 in the final contact stage of the cascade. A pH ranging from about 1 to about 5 is typical. A range of about 2 to about 3 is preferred.

The reaction temperature may vary widely. The reaction is usually carried out at a temperature ranging from about 0° C. to about 100° C. A range of from about 40° C. to about 90° C. is typical. The preferred temperature range is from about 75° C. to about 80° C.

Atmospheric pressure is normally employed although higher or lower pressures may be used.

The basic principles of the present invention are illustrated by reference to the figures. The illustrated process shows the formation of hydrazoic acid by acidifying sodium azide with hydrochloric acid. The hydrazoic acid so produced is contacted with potassium hydroxide to produce potassium azide although the hydrazoic acid can be put to a number of other uses. Because sodium azide produced by the Wislicenus method produces one mole of sodium hydroxide for each mole of sodium azide produced, it is often convenient to acidify the mixture rather than separate the sodium hydroxide from the sodium azide before acidifying the sodium azide. If the sodium hydroxide is not removed, additional acid will be required to neutralize it when the sodium azide is acidified.

Referring now in more detail to FIG. 1, equimolar portions of sodium azide and sodium hydroxide are fed through line 1 to mix tank 2 where they are contacted with hydrochloric acid introduced through line 4. A gas stream containing mostly nitrogen, a small percentage (usually about 3 percent) of hydrazoic acid, some water vapor, and some hydrogen chloride is introduced through line 6 and sparger 7 and bubbled through the mixture in mix tank 2 to dilute any hydrozoic acid formed and sweep it from the mix tank through line 8. Because hydrazoic acid is explosive in concentrated amounts, dilution by an inert gas such as nitrogen, helium, argon, neon, xenon, krypton, air, methane, ethane, water vapor, $CF_4$, $CF_3Cl$ or mixtures thereof is desirable to reduce the possibility of an explosion. The gas in line 8 advantageously contains about 5 to 8 percent hydrazoic acid. Greater or lesser proportions may be used if desired. Liquid from mix tank 2 having a pH of about 5 to 6 is forwarded to mix tank 10 through line 12 by pump 14. Hydrochloric acid is introduced through line 16 to lower the pH of the reaction mixture to about 2 to 3 . Nitrogen containing small amounts of hydrazoic acid and water vapor is introduced through line 18 and sparger 20 to sweep hydrazoic acid from mix tank 10 through line 6 and into the mixture contained in mix tank 2. A gas stream including nitrogen, hydrazoic acid, and water vapor is passed through line 8 to scrubber 24 where it is contacted with aqueous potassium hydroxide introduced through line 26. The scrubber may be of any of many conventional designs such as, for example, a bubble cap column, sieve tray column, packed column, spray column, disc and donut column, or liquid filled column. Flow may be either countercurrent or parallel. In FIG. 1, a packed column utilizing countercurrent flow is shown. Potassium azide solution removed from scrubber 24 through line 28 may be used directly as an aqueous solution or it may be forwarded for further processing such as crystallization, drying, and packaging. Nitrogen, some water vapor, and a small amount (on the order of about 1 percent) hydrazoic acid are removed from scrubber 24 through line 30 where they are forwarded by blower 32 to lines 34 and 36. Most of the gas leaving the scrubber 24 passes through line 36 to line 18 and thence into mix tank 10. A minor portion of the gas leaving scrubber 24 passes through line 34 through condenser 38 of stripping column 40, through line 39 and on to line 18 where it combines with the gas flow from line 36 for passage through the liquid in mix tank 10. It may be seen that nitrogen is recycled through mix tanks 2 and 10 and through scrubber 24 thereby containing most of the hydrazoic acid within the system. Make-up nitrogen may be added at any convenient location in the nitrogen system. Should there be any build-up of inert gases in the nitrogen system, the excess may be vented, preferably through a basic solution to neutralize any hydrazoic acid present. Liquid from mix tank 10 usually contains some dissolved hydrazoic acid which is often advantageously recovered. Stripping column 40 is suitable for this purpose. The stripping column itself is of conventional design and may conveniently be a bubble cap column, a sieve tray column, a packed column, or some similar device. Liquid from mix tank 10 is passed through line 42 by pump 44 and introduced to stripping column 40 at or near the top thereof. Vapor taken overhead is passed through line 46 to condenser 38. Condenser 38 is preferably run at total reflux. Reflux may be returned to stripping column through line 48. Nitrogen from line 34 is passed through condenser 38 where it entrains non-condensibles and hydrazoic acid and passes through lines 39 and 18 to mix tank 10. Bottoms comprising principally sodium chloride solution are removed from the stripping column through line 50 and split into two streams. One of these streams passes through line 52 to reboiler 54 where it is heated and returned to stripping column 40 through line 56. The other stream passes through line 58 for use or disposal of the by-product salt solution.

Figure 2:
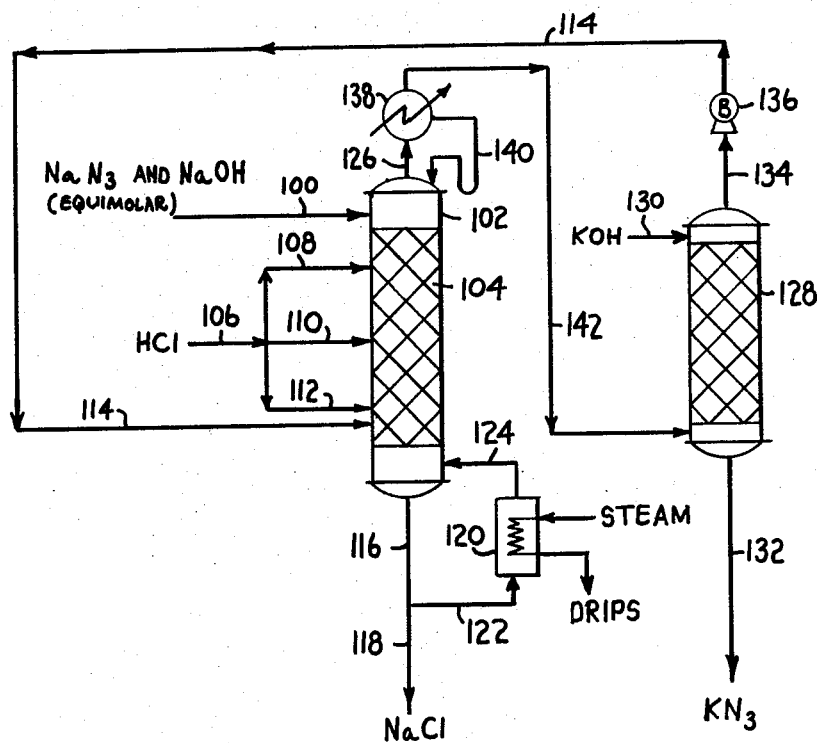

FIG. 2 shows the acidification of sodium azide with hydrochloric acid using a cascade of three stages contained within a single column. Equimolar portions of sodium azide and sodium hydroxide are fed through line 100 to column 102 containing packing 104. Many other well known gas-liquid contact devices are equally as suitable, including liquid filled columns, bubble cap columns, sieve tray columns, and disc and donut columns. As the aqueous solution of sodium azide and sodium hydroxide percolates downwardly through the packing, it is contacted with hydrochloric acid introduced through lines 106, 108, 110, and 112. A pH gradient is accordingly established along the length of the column. Typical terminal values of pH would be 8 to 14 at the top and 2 to 3 at the bottom. An inert gas such as nitrogen is introduced to column 102 through line 114 to dilute any hydrazoic acid formed and sweep it up the column. Bottoms comprising principally sodium chloride solution are removed through lines 116 and 118. Optionally, a reboiler 120 may be used to strip hydrazoic acid dissolved in the sodium chloride solution. When the reboiler is used, the bottoms from column 102 are split into two streams. One of these streams passes through line 122 to reboiler 120 where it is heated and returned to column 102 through line 124. Vapor containing hydrazoic acid and nitrogen is taken overhead from column 102 through line 126. This vapor may be passed to scrubber 128 where it is contacted with aqueous potassium hydroxide introduced through line 130 to produce potassium azide which is withdrawn through line 132. Nitrogen, water vapor, and a small amount of hydrazoic acid are removed from scrubber 128 through line 134 where they are forwarded by blower 136 through line 114 to column 102. The scrubber and its operation is similar to that described with reference to FIG. 1. If reboiler 120 is employed, it may be desirable to use optional condenser 138 which is preferably operated at total reflux, to remove heat from the overhead stream. Reflux may be returned to columns 102 through line 140. The cooled vapor stream is then passed through line 142 to scrubber 128. It is possible to omit condenser 134 when reboiler 120 is employed if the heat input is controlled so that the heat load on the overhead stream is not excessive.

The above systems for recovery of hydrazoic acid from a solution containing the by-product salt of the feed acid have been described with respect to a continuous process for producing hydrazoic acid but the principles are equally applicable to a batch process.

Although the detailed process for the production of hydrazoic acid which has been described has been incorporated into an over-all process for converting sodium azide into potassium azide using hydrazoic acid as an intermediate, it will be appreciated that flexibility is an outstanding advantage. By varying the identities of the feed azide and the base fed to the scrubber, a large number of azides may be converted to other azides. Thus, an alkali metal azide may be converted into another alkali metal azide as shown in detail herein, alkali metal azide may be converted into alkaline earth metal azide, alkaline earth metal azide may be converted to alkali metal azide, and alkaline earth metal azide may be converted to another alkaline earth metal azide. Even the same azide as the feed azide may be regenerated by scrubbing with the appropriate base. Feed azide suitable for use in this invention includes lithium azide, sodium azide, potassium azide, rubidium azide, cesium azide, beryllium azide, magnesium azide, calcium azide, strontium azide, and barium azide. Of the alkali metal azides, sodium azide and potassium azide are most often used. Sodium azide is preferred. Of the alkaline earth metal azides, magnesium azide, calcium azide, strontium azide, and barium azide are most often used. Magnesium azide and calcium azide are preferred. Of course, mixtures of azides are suitable for use.

The base selected for feeding to the scrubber may be any soluble hydroxide or salt of the alkali metals or alkaline earth metals which will react to form the azide. Exemplary salts are the soluble carbonates such as sodium carbonate or potassium carbonate. Even slightly water-soluble compounds such as calcium carbonate or magnesium carbonate may be used. It is convenient to utilize a slurry of the slightly soluble salts which react with hydrazoic acid in order to promote both mutual contact of the salt and hydrazoic acid and ease of handling. Examples of compounds suitable for feeding to the scrubber include lithium hydroxide, sodium hydroxide, potassium hydroxide, rubidium hydroxide, cesium hydroxide, magnesium hydroxide, calcium hydroxide, strontium hydroxide, barium hydroxide, dimethylberyllium (anhydrous solvent), diethylmagnesium (anhydrous solvent), magnesium carbonate and calcium carbonate.

While the invention has been described with reference to certain illustrative embodiments, it is not intended that it shall be limited thereby except insofar as appears in the accompanying claims.

What is claimed is:

1. In the method of preparing hydrazoic acid from a feed azide selected from the group consisting of alkali metal azide and alkaline earth metal azide wherein said feed azide is contacted with a feed acid to generate hydrazoic acid, the improvement comprising:
   (a) maintaining a cascade of individual contacting stages wherein the stages
      (1) contain liquid having azide values therein, and
      (2) are arranged in order of decreasing pH for the liquid contained therein;
   (b) contacting in each of said stages said liquid having azide values therein with said feed acid to form hydrazoic acid;
   (c) underflowing liquid along said cascade to stages of decreasing pH;
   (d) transferring a gas stream containing hydrazoic acid along said cascade to stages of increasing pH where said gas stream is contacted with liquid contained therein;
   (e) withdrawing liquid from the last stage of said cascade; and
   (f) removing gaseous hydrazoic acid from the first stage of said cascade.

2. The method of claim 1 wherein said feed acid is hydrochloric acid.

3. The method of claim 1 wherein an inert gas is introduced to the last stage of said cascade.

4. The method of claim 3 wherein the inert gas is essentially free of hydrazoic acid when it is introduced to said last stage.

5. The method of claim 3 wherein the inert gas is in admixture with hydrazoic acid when it is introduced to said last stage.

6. The method of claim 3 wherein said inert gas is nitrogen.

7. The method of claim 1 wherein the pH of the liquid in the first stage is in the range of from about 5 to 6 and the pH of the liquid in the last stage is in the range of from about 2 to about 3.

8. The method of claim 7 wherein the cascade comprises two stages.

9. The method of claim 1 wherein said feed azide is sodium azide.

10. In the method of preparing an azide selected from the group consisting of alkali metal azide and alkaline earth metal azide wherein a feed azide selected from the group consisting of alkali metal azide and alkaline earth metal azide is contacted with a feed acid to generate hydrazoic acid and wherein generated hydrazoic acid is contacted with a basic compound of at least one alkali metal or alkaline earth metal, the improvement comprising:
   (a) maintaining a cascade of individual contacting stages wherein the stages
      (1) contain liquid having azide values therein, and
      (2) are arranged in order of decreasing pH for the liquid contained therein;
   (b) contacting in each of said stages said liquid having azide values therein with said feed acid to form hydrazoic acid;
   (c) underflowing liquid along said cascade to stages of decreasing pH;
   (d) transferring a gas stream containing hydrazoic acid along said cascade to stages of increasing pH where said gas stream is contacted with liquid contained therein;
   (e) withdrawing liquid from the last stage of cascade; and
   (f) forwarding gaseous hydrazoic acid from the first stage of said cascade for contacting with said basic compound.

11. The method of claim 10 wherein said feed acid is hydrochloric acid.

12. The method of claim 10 wherein an inert gas is introduced to the last stage of said cascade.

13. The method of claim 12 wherein the inert gas is essentially free of hydrazoic acid when it is introduced to said last stage.

14. The method of claim 12 wherein the inert gas is in admixture with hydrazoic acid when it is introduced to said last stage.

15. The method of claim 12 wherein said inert gas is nitrogen.

16. The method of claim 10 wherein the pH of the liquid in the first stage is in the range of from about 5 to about 6 and the pH of the liquid in the last stage is in the range of from about 2 to about 3.

17. The method of claim 16 wherein the cascade comprises two stages.

18. The method of claim 9 wherein said feed azide is sodium azide.

19. In the method of preparing potassium azide from sodium azide wherein said sodium azide is contacted with a feed acid to generate hydrazoic acid and wherein generated hydrazoic acid is contacted with potassium hydroxide to produce potassium azide, the improvement comprising:
   (a) maintaining a cascade of individual contacting stages wherein the stages
      (1) contain liquid having azide values therein, and
      (2) are arranged in order of decreasing pH for the liquid contained therein;
   (b) contacting, in each of said stages, said liquid having azide values therein with said feed acid to form hydrazoic acid;
   (c) underflowing liquid along said cascade to stages of decreasing pH;
   (d) transferring a gas stream containing hydrazoic acid along said cascade to stages of increasing pH where said gas stream is contacted with liquid contained therein;

(e) withdrawing liquid from the last stage of said cascade; and (f) forwarding gaseous hydrazoic acid from the first stage of said cascade for contacting with said potassium hydroxide.

20. The method of claim 19 wherein said feed acid is hydrochloric acid.

21. The method of claim 19 wherein an inert gas is introduced to the last stage of said cascade.

22. The method of claim 21 wherein the inert gas is essentially free of hydrazoic acid when it is introduced to said last stage.

23. The method of claim 22 wherein said inert gas is nitrogen.

24. The method of claim 21 wherein the inert gas is in admixture with hydrazoic acid when it is introduced to said last stage.

25. The method of claim 24 wherein said inert gas is nitrogen.

26. The method of claim 19 wherein the pH of the liquid in the first stage is in the range of from about 5 to about 6 and the pH of the liquid in the last stage is in the range of from about 2 to about 3.

27. The method of claim 26 wherein said feed acid is hydrochloric acid.

28. The method of claim 26 wherein said cascade comprises two stages.

References Cited

UNITED STATES PATENTS 2,664,341   12/1953   Kesting _____ 23—152

OTHER REFERENCES

Reitzner et al., "Picatinny Arsenal Technical Memo. 1187," Dover, N.J., 1963.

Audrieth et al. in Inorganic Synthesis, vol. 1, McGraw-Hill Book Co.; N.Y., 1939, pp. 77–79.

OSCAR R. VERTIZ, Primary Examiner

G. O. PETERS, Assistant Examiner

U.S. Cl. X.R.

423—413